(12) United States Patent
Lingaraju et al.

(10) Patent No.: US 11,930,093 B2
(45) Date of Patent: Mar. 12, 2024

(54) INVENTORY MANAGEMENT FOR DATA TRANSPORT CONNECTIONS IN VIRTUALIZED ENVIRONMENT

(71) Applicant: VMware LLC, Palo Alto, CA (US)

(72) Inventors: Varun S. Lingaraju, San Jose, CA (US); Lei Lu, Campbell, CA (US); Maarten Wiggers, Mountain View, CA (US); Pradeep Ramachandra, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 35 days.

(21) Appl. No.: 17/579,220

(22) Filed: Jan. 19, 2022

(65) Prior Publication Data
US 2023/0229427 A1  Jul. 20, 2023

(51) Int. Cl.
*H04L 67/60* (2022.01)
*G06F 8/656* (2018.01)
*G06F 9/455* (2018.01)

(52) U.S. Cl.
CPC .............. *H04L 67/60* (2022.05); *G06F 8/656* (2018.02); *G06F 9/45558* (2013.01); *G06F 2009/45595* (2013.01)

(58) Field of Classification Search
CPC ............. G06F 8/60–70; G06F 9/45558; G06F 2009/45595; H04L 67/60
USPC .................................................. 717/168–178
See application file for complete search history.

(56) References Cited

U.S. PATENT DOCUMENTS

2010/0191845 A1\* 7/2010 Ginzton ............... G06F 9/4856
718/1
2021/0234923 A1\* 7/2021 Kumar ............... H04L 67/1012

OTHER PUBLICATIONS

Virtual Machine, Wikipedia, 2021, 9 pages, [retrieved on Oct. 25, 2023], Retrieved from the Internet: <URL:https://web.archive.org/web/20211231030419/https://en.wikipedia.org/wiki/Virtual_machine>.\*

\* cited by examiner

*Primary Examiner* — Geoffrey R St Leger
(74) *Attorney, Agent, or Firm* — King Intellectual Asset Management

(57) ABSTRACT

Aspects of managing inventory for data transport connections within a virtualized computing environment are described. A virtualized management system managing a cluster of host devices obtains a data transport capacity parameter and an aggregate memory consumption value from respective host devices. The virtualized management system further identifies an update status associated with each of the host devices. In response to receiving a data transport connection request, the virtualized management system selects a host from the cluster of hosts to satisfy the data transport connection request based at least in part on the upgrade status, data transport capacity parameter and aggregate memory consumption value.

20 Claims, 5 Drawing Sheets

INVENTORY MANAGEMENT FOR DATA TRANSPORT CONNECTIONS IN VIRTUALIZED ENVIRONMENT

BACKGROUND

Cloud computing systems can extend the capabilities of an organization's data center using computing resources such as virtual machines. A virtualized computing environment can include various host devices that are executing virtual machines that perform various tasks for an enterprise. The virtualized computing environment can support a virtual desktop infrastructure, server infrastructure, user authentication services, security systems, or other computing needs and tasks that might be required by an enterprise. The virtualized computing environment can be managed by a virtualization management system that can manage a virtual infrastructure across a public, private, or hybrid cloud environment. The virtualization management system can also orchestrate containerized execution environments that allow an enterprise to deploy or publish applications for its users.

As the scale, scope, and importance of virtualized computing environments increases, downtime of an environment comes with increasing costs. An enterprise might be resistant to experiencing any downtime of the environment. However, upgrading the virtualized computing environment, and in particular, the host devices, is periodically necessary. Upgrade of the host devices via the virtualization management system can introduce new features, fix bugs and errors, and improve the functioning of the virtualized computing environment, which can in turn improve the ability of administrators to manage a virtualized computing environment. In some instances, the host devices may have active data transport connections established for backing up data. This activity can impede and delay the upgrade of a given host device when the virtualization management system is unaware of the data transport connections that are active on a given host device. Therefore, improving the upgrade experience of the host devices by providing the virtualizing management system with the knowledge of the data transport connection inventory and status associated with the host devices can be an important feature.

DETAILED DESCRIPTION

Figure 1:
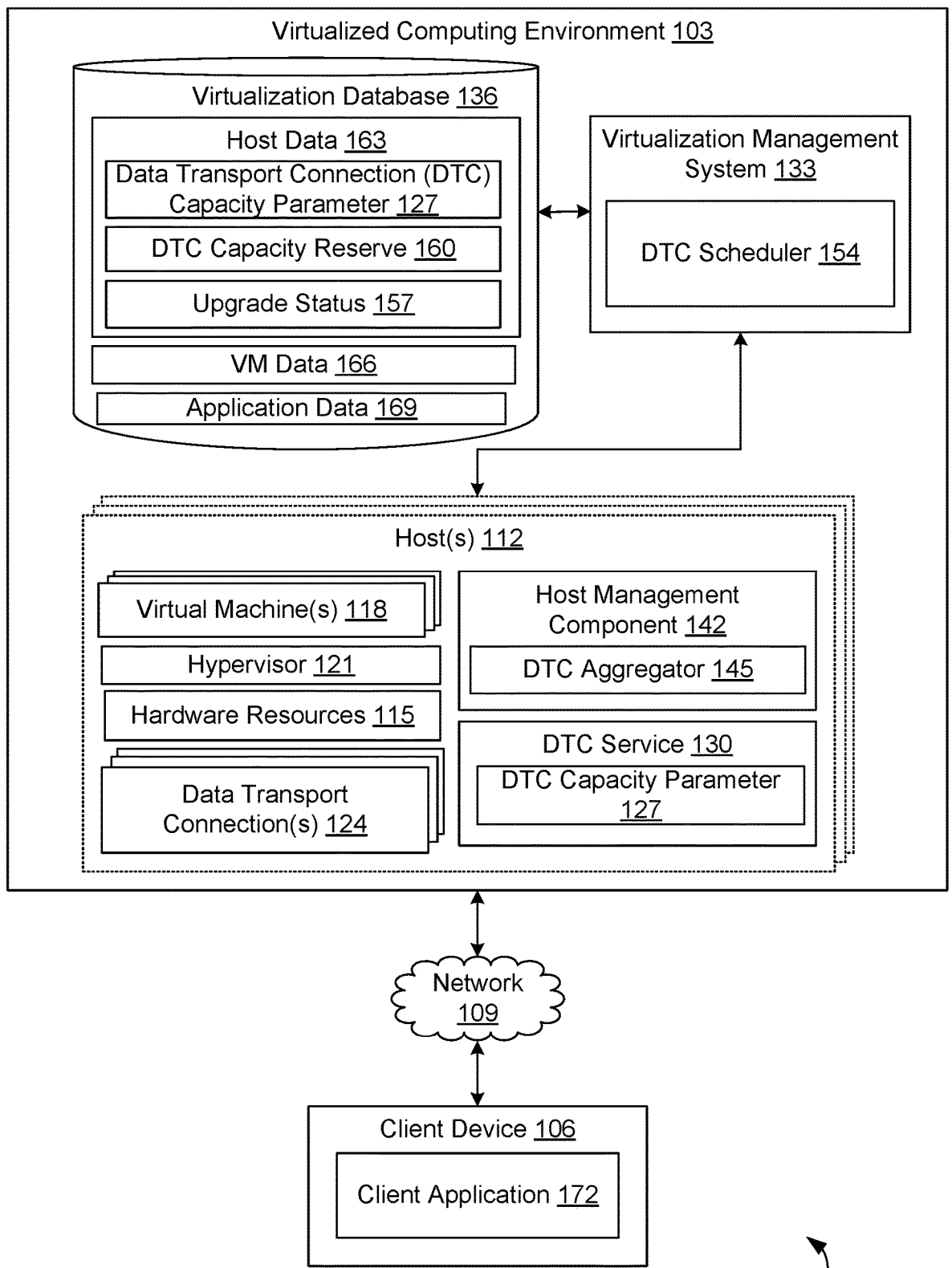
FIG. 1 is an example of a block diagram of a networked environment including a virtualization computing environment according to various examples of the disclosure.

The present disclosure relates to managing host inventory for data transport connections (DTC) within a virtualized computing environment. In public, private, or hybrid cloud environments deployed on behalf of an enterprise, a virtualization management system is often deployed to manage various host devices powering the environment, the virtual machines (VMs) that are running on the environment, and the applications that are running on the VMs. For example, an enterprise can create software defined datacenters (SDDC) that are managed by the virtualization management system.

A data transport connection can be defined as the channel through which bulk data can be transferred between a server and a client. In some examples, data transport connections comprise specific transfer protocols that can be used in a virtualized computing environment in order to transfer data from one host device to another host device. In various examples, a data transport connection can comprise a network file copy (NFC) session, an HTTP session, a data migration session, and/or other type of data transport session. For example, a data transport connection can correspond to a scheduled backup of one or more of the host devices as defined by an SDDC administrator where the data associated with a host is copied and transferred to another host device or other suitable computing or data storage device.

In various examples, the virtualization management system fails to have a visibility into the data transport connections on the host devices or up-to-date information on the actual data transport connection resource pool usage on a host device. This leads to localized inefficient resource management for DTC connections. Furthermore, in some instances, enterprise administrators using backup applications or control plane services for data transport connections might not be using the resources of the host devices efficiently. This could result in longer data transfer times or denial of service if the host's data transport connection resources are saturated.

In addition, while the virtualization management system could be provided a list of data transport connections currently active on a host, this number changes every time there is an establishment or removal of a data transport connection on the host which may result in an undesirable number of updates to the virtualization management system from the hosts. In addition, since each data transport connection may use a different amount of memory, the virtualization management system would still not be provided a comprehensive understanding of the memory usage and capacity associated with a given data transport connection. Accordingly, it would be beneficial for the virtualization management system to have the knowledge of the active data transport connections occurring on the managed host devices without the risk of too many updates which can compromise additional performance constraints.

In addition, the services and applications installed on host devices within the SDDC require upgrades overtime that are initiated and managed by the virtualization management system. However, an upgrade for a host device can be delayed due to active data transport connections (e.g., network file transfers, network file copy) that are established on host devices and are unknown to the virtualization management system. For example, if a given enterprise is performing backups of their assigned virtual machines (e.g., host devices) during a scheduled SDDC upgrade activity, the presence of network transport connections on the host devices can block the host device from entering a maintenance mode status that is required for upgrade, and thus increase the time taken to complete the planned upgrade. This can result in a manual intervention to terminate the network transport connection sessions on the host device to unblock the upgrade. Accordingly, it would be beneficial for the virtualization management system to have the knowledge of the active data transport connections occurring on the managed host devices for decision making purposes when scheduling upgrades of hosts in a virtualized environment.

Examples of this disclosure introduce a mechanism to provide the properties of data transport connections ongoing on the host devices to the virtualization management system in an efficient and timely manner, thereby strengthening the virtualization management system's ability to act as a single centralized scheduler to perform host selection and memory admission checks for new data transport connections. This combined with the knowledge of which host devices of an SDDC are already upgraded, allows the virtualization management system to make the upgrade process seamless and predictable. An example of a virtualization management system according to this disclosure includes VMware® vCenter Server, which can include a server that enables administrators to centrally manage virtual machines that are deployed across hosts within a virtualized computing environment.

FIG. 1 is a block diagram of a networked environment 100 in which one or more embodiments of the present disclosure may be implemented. The networked environment 100 includes a virtualized computing environment 103, a client device 106, and other systems that are in communication over a network 109. The network 109 can include, for example, wide area networks (WANs), local area networks (LANs), wired networks, wireless networks, other suitable networks, or any combination of two or more networks. For example, the network 109 can include satellite networks, cable networks, Ethernet networks, and other types of networks. The network 109 can also include a combination of two or more networks 109. Examples of networks 109 can include the internet, intranets, extranets, virtual private networks (VPNs), and similar networks.

In one embodiment, the virtualized computing environment 103 can be a data center controlled and administrated by a particular enterprise or business organization. The virtualized computing environment 103 can also include hardware resources that are operated by a cloud computing service provider and exposed as a service available to account holders, such as the enterprise in addition to other enterprises. As such, the virtualized computing environment 103 can include an on-premise data center as well as an off-premise data center(s). In some embodiments, virtualized computing environment 103 itself may be configured as a private cloud service provided by the enterprise.

The virtualized computing environment 103 includes one or more hosts 112, which are also referred to as host devices or host computer systems. The virtualized computing environment 103 and its hosts 112 can be deployed as a VMware vSphere® environment that delivers and powers a virtual infrastructure. Hosts 112 can be constructed on a server grade hardware platform, such as an x86 architecture platform. The hardware platform of each host 112 can include conventional components or hardware resources 115 of a computing device, such as one or more processors (CPUs), system memory, a network interface, storage, and other I/O devices. A host 112 can include or be in communication with storage, such as local storage devices (e.g., one or more hard disks, flash memory modules, solid state disks, and optical disks) and/or a storage interface that enables host 112 to communicate with one or more network data storage systems. Examples of a storage interface are a host bus adapter (HBA) that couples host 112 to one or more storage arrays, such as a storage area network (SAN) or a network-attached storage (NAS), as well as other network data storage systems.

The various components of hardware resources 115 of the hosts 112 can differ across different hosts 112. For example, the processor in one host 112 may belong to the Intel® family of processors while the processor in a different host 112 may belong to the AMD® family of processors. Processors may also differ in other ways, such as processor speed, architecture bit size, and in other ways.

Each host 112 is configured to provide a virtualization layer that abstracts processor, memory, storage, and networking resources of hardware platform into multiple virtualized execution contexts, which includes environments in which software, such as applications, may execute and be isolated from other software. Examples of virtualized execution contexts include virtual machines, containers (such as Docker containers), and other contexts. In some embodiments, the virtualized execution contexts are virtual machines 118 that can run concurrently on the same hosts. VMs 118 run on top of a software interface layer, referred to herein as a hypervisor 121, that enables sharing of the hardware resources of host 112 by VMs 118. One example of hypervisor 121 that may be used in an embodiment described herein is a VMware® ESXi hypervisor provided as part of the VMware vSphere® solution. Hypervisor 118 may run on top of the operating system of host 112 or directly on hardware components of a host 112.

Each host 112 is configured to establish one or more data transport connections 124 to transfer data from the host 112 to another host 112 or other suitable device. A data transport connection 124 comprises one or more transfer protocols (e.g., Network File Copy (NFC) by VMware®, HTTP, vMotion® by VMware® etc.) that can be used in the virtualized computing environment 103 in order to transfer data from one host 112 to another host 112. In various examples, data transport connections 124 are established to backup data associated with the host 112 or otherwise transfer or copy data from one host 112 to another host 112 or other suitable computing or data storage device. A typical data transport connection 124 can be defined by various properties, including an identifier of the connection, interne protocol (IP) addresses of the server and the client, a size of the data being transferred, an estimated time to complete the data transfer, a static memory consumed by the data transfer process in terms of any buffers allocated, dynamic memory consumed by the transfer process, an identifier of the task that requested this data transfer and/or other types of properties.

In various examples, the memory used by a data transport connection 124 comes from a fixed size resource pool on the host 112 that is defined by the DTC capacity parameter 127 which is a configurable parameter associated with a DTC service 130. In various examples, the DTC capacity parameter 127 corresponds to value representing a total memory capacity for data transport connections 124 on a given host 112. The DTC capacity parameter 127 can include a streaming memory capacity as part of the total memory capacity. The DTC capacity parameter 127 is a configurable value that can be defined by an enterprise administrator and can vary among hosts 112. In some examples, the DTC capacity parameter 127 corresponds to ninety-six (96) megabytes (MB). In other examples, the DTC capacity parameter 127 corresponds to another configurable value as defined by the enterprise administrator. The value of the streaming memory capacity which is part of the DTC capacity parameter 127 is also configurable.

The DTC service 130 is configured to establish and manage the data transport connections 124 occurring on a given host 112. In various examples, the DTC service 130 is further configured to report the DTC capacity parameter 127 to the virtualization management system 133 and persist the DTC capacity parameter 127 to the virtualization database 136. This value can be used by the virtualization management system 133 in decisions related to host selection for new data transport connections as well as determining an upgrade schedule for upgrading hosts 112. In various examples, the DTC service 130 reports the DTC capacity parameter 127 to the virtualization management system 133 via a first type of communication channel 139 (FIG. 2) that is used to communicate updates to property changes of inventory objects on the host 112 that are managed by a virtualization management system 133. For example, when the value of the DTC capacity parameter 127 is modified, the new value is reported to the virtualization management system 133 via the first type of communication channel 139. An example of the first type of communication channel 139 is VMWare's host sync.

Each host 112 includes a host management component 142 that can be executed on the host 112 to communicate with or otherwise interface with the virtualization management system 133. In various examples, the host management component 142 can receive instructions from the virtualization management system 133 with regard to the operation of a given host 112. For example, the instructions received from the virtualization management system 133 can include instructions related to upgrade of one or more services or applications running on the host 112, the management of virtual machines 118 running within each host 112, the provisioning of virtual machines, the migration of hosts 112 and/or other information.

Figure 2:
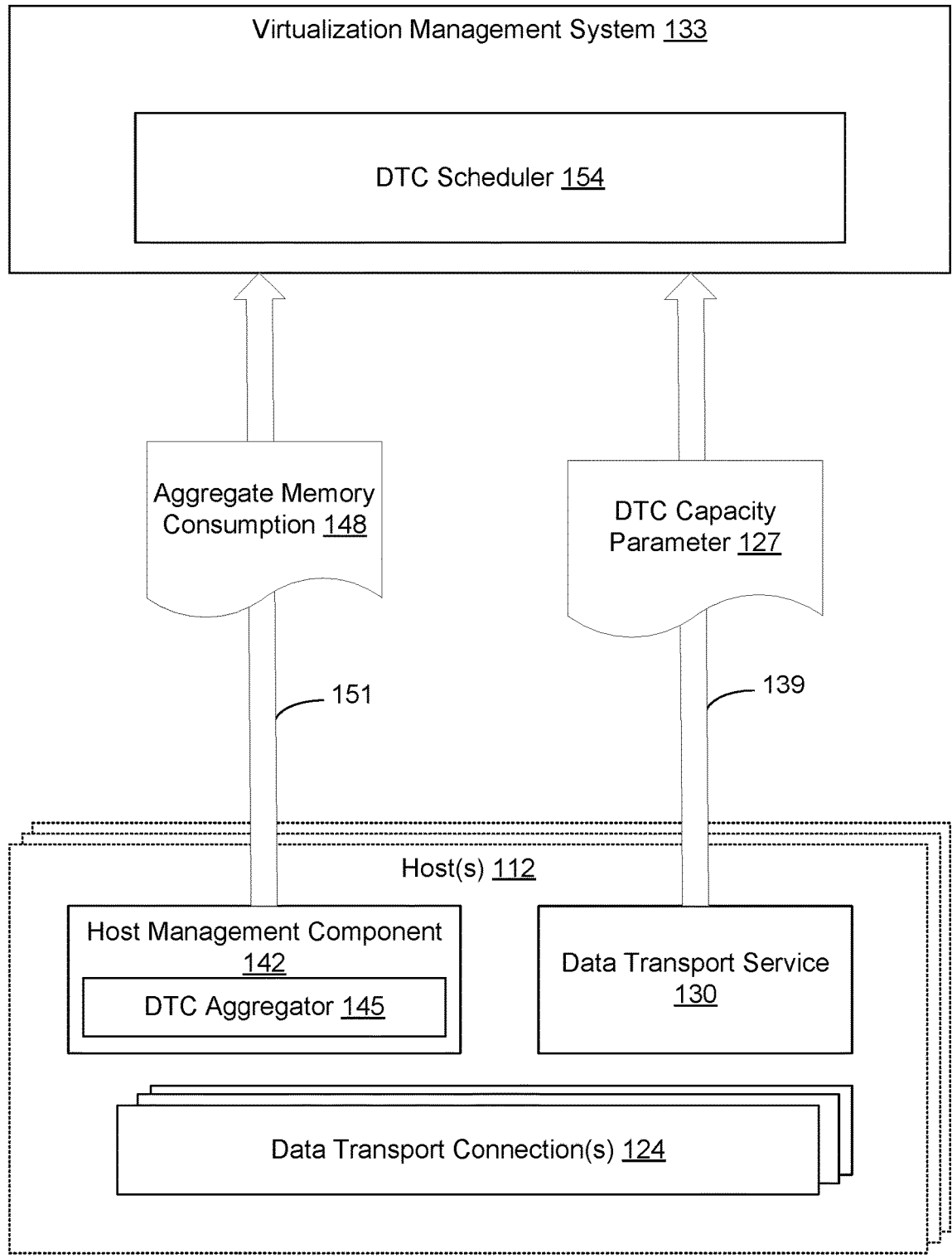
FIG. 2 is a block diagram of the virtualized computing environment of FIG. 1 according to various examples of the disclosure.

In various examples, the host management component 142 includes a DTC aggregator 145 that is configured to listen to every data transport connection 124 occurring on a given host to determine an aggregate memory consumption 148 (FIG. 2). In particular, the DTC aggregator 145 determines a memory consumption associated with each data transport connection 124 and calculates the aggregate memory consumption 148 based on the sum of the values for the memory consumption of each data transport connection 124. The aggregate memory consumption 148 can be used by the virtualization management system 133 in decisions related to host selection for new data transport connections as well as determining an upgrade schedule for upgrading hosts 112. In various examples, the host management component 142 communicates the aggregate memory consumption 148 as a performance statistic to the virtualization management system 133 via a second type of communication channel 151 (FIG. 2) that is used to communicate dynamically changing performance statistics associated with the host 112. In various examples, the performance statistics are communicated with to the virtualization management system 133 periodically (e.g., every minute, every five minutes, every hour, etc.). An example of a property update communication channel 135 is VMWare's Quick Stats.

Virtualized computing environment 103 includes a virtualization management module (depicted in FIG. 1 as a virtualization management system 133) that can communicate with the plurality of hosts 112. In one embodiment, the virtualization management system 133 is a computer program that resides and executes in a central server, which may reside in virtualized computing environment 103, or alternatively, can run in a VM in one of hosts 112. One example of a virtualization management module is the vCenter Server® product made available from VMware, Inc. The virtualization management system 133 is configured to carry out administrative tasks for the virtualized computing environment 103, including managing hosts 112, managing VMs 118 running within each host 112, provisioning VMs, 118 migrating VMs 118 from one host 112 to another host 112, and load balancing between hosts 112. In one embodiment, the virtualization management system 133 can manage and integrate virtual computing resources provided by a third party cloud computing system with virtual computing resources of virtualization management system 133 to form a unified "hybrid" computing platform.

The virtualization management system 133 includes a DTC scheduler 154 that is configured to select candidate hosts 112 within a data center to satisfy data transport connection requests. The DTC scheduler 154 obtains the data transport data (e.g., aggregate memory consumption 148, DTC capacity parameter 127) and upgrade status 157 for each host 112 and selects a host 112 to satisfy a given data transport connection request based at least in part on this information. In various examples, the DTC scheduler 154 determines a DTC capacity reserve 160 to assign to a given host 112 in response to selecting the given host 112 to satisfy the data transport connection request. The DTC capacity reserve 160 corresponds to a standard memory consumption for a given data transport connection 124. This DTC capacity reserve 160 can further be used by the DTC scheduler 154 in selecting hosts to satisfy subsequent data transport requests to compensate for a previously assigned data transport connection 124 that may not yet be present in the aggregate memory consumption 148 for the given host 112.

In various examples, the DTC scheduler 154 selects a host 112 for satisfying a data transport connection request according to a variety of factors including the upgrade status 157 and the available data transport capacity. Additional factors that may be considered for selecting a host 112 can include minimum CPU requirements, minimum network bandwidth requirements, minimum storage requirements, prioritization policies (e.g., version of host hypervisor 121, upgrade status, etc.), and/or other factors. In some examples, one or more of the factors can be assigned weights which can provide further optimization associated with the host selection.

In various examples, in response to receiving a data transport connection request, the DTC scheduler 154 identifies all the hosts 112 within the data center that are connected to the virtualization database 136. With a consideration of potential upgrades for the hosts 112, the DTC scheduler 154 further filters out candidate hosts 125 having an upgrade status 157 that indicates that there are in a maintenance mode (e.g., currently being upgraded) or are scheduled to be in a maintenance mode (e.g., upgrade pending). In some examples, fault domains associated with candidate hosts are considered where virtual machines 118 may be executed in a multi fault-domain setup. In these scenarios, the DTC scheduler 154 filters out candidate hosts 112 that are in different fault domains (e.g., hardware components of hosts 112 sharing a single point of failure) to reduce the data transfer overhead across different data centers.

Based on the remaining candidate hosts 112, the DTC scheduler 154 analyzes the data transport connection information (aggregate memory consumption 148, DTC capacity parameter 127), the DTC capacity reserve 160, if applicable, and/or other factors (e.g., minimum CPU requirements, minimum network bandwidth requirements, minimum storage requirements, prioritization policies, etc.) to identify the optimal host 112 for satisfying a data transport connection 124 associated with the data transport connection request. For example, the optimal host 112 may comprise the host 112 with the most data transport resources available.

The virtualized computing environment 103 can include a virtualization database 136. The virtualization database 136 can comprise a database that supports the virtualization management system 133 by storing information about the deployment of the hosts 112 and VMs 118 in the environment. The virtualization database 136 can include mass storage resources of the virtualized computing environment 103. The database can include one or more relational databases, such as a structured query language (SQL) database or a no-SQL database. The database can also include non-relational databases in some examples. The data stored in the virtualization database 136 can be associated with the operation of the various applications or functional entities described below.

The data stored in the virtualization database 136, for example, can include host data 163, VM data 166, application data 169, and other data. In the context of this disclosure, the virtualization database 136 can house information that facilitates the functioning of the virtualization management system 133. For example, the host data 163 can contain information about the hosts 112 that are managed by the virtualization management system 133. The information can include host CPU information, including a CPU frequency, CPU vendor, CPU thread information, information about the cores of host CPUs, and other CPU data. Host data 163 can also include data about PCI slots, bus data, host network configuration, disk resources, and other information about the hardware resources 115 of hosts 112 within the virtualized computing environment 103. Host data 163 can also include alarms or notifications that are attached to the hosts 112, information about the hypervisor 121 executed by a host 112, or other software aspects of the host configuration.

VM data 166 represents information about VMs 118 that are executed by hosts 112 within the virtualized computing environment 103. VM data 166 can include allocated CPU, memory, and storage resources for the various VMs, network configuration for the VMs, or an operating system image for the VMs. VM data 166 can also include certificate data, encryption data, security credentials, or other data needed to configure and operate VMs 166 within the virtualized computing environment 103. Application data 169 can represent information about applications, tasks, containers or other resources that are running on VMs within the virtualized computing environment 103 on behalf of an enterprise.

The client device 106 can represent a computing device coupled to the network 109. The client device 106 can be a processor-based computer system. According to various examples, the client device 106 can be in the form of a desktop computer, a laptop computer, a personal digital assistant, a mobile phone, a smartphone, or a tablet computer system. The client device 106 can execute an operating system, such as Windows™, Android™, or iOS®, and has a network interface to communicate with the network 109. The client device 106 can execute a client application 172 that can be used to define and/or adjust parameter settings associated with a SDDC. For example, an administrator can define and/or adjust the DTC capacity parameter 127 for various hosts. Accordingly, in response to the DTC capacity parameter 127 being modified, the DTC service 130 can send a property update notification to the virtualization management system 133 notifying the virtualization management system 133 of the change.

Turning now to FIG. 2, shown is a block diagram of the virtualization computing environment 103 in accordance of various embodiments of the present disclosure. In particular, FIG. 2 is an example of a block diagram illustrating the techniques for notifying the virtualization management system 133 of the data transport information (e.g., aggregate memory consumption 148 and DTC capacity parameter 127) associated with active data transport connections 124 occurring on the host 112. In order for the DTC scheduler 154 to perform optimal host selection and memory admission checks for incoming data transport connection requests, the DTC scheduler 154 requires the total capacity of the data transport connections 124 (e.g., DTC capacity parameter 127) on the hosts 112 and the properties of ongoing data transport connections 124 (e.g., aggregate memory consumption 148) running on hosts 112.

One or more data transport connections 124 can be occurring on a host 112 at a given time to transfer data from the host 112 to another host 112 or other suitable device. In various examples, the memory used by a data transport connection 124 is defined by the DTC capacity parameter 127 which is a configurable parameter associated with a DTC service 130. In response to a change in the DTC capacity parameter, the DTC service 130 reports the DTC capacity parameter 127 to the virtualization management system 133. This value is used by the virtualization management system 133 in decisions related to host selection for new data transport connections 124. The DTC service 130 reports the DTC capacity parameter 127 through a first type of communication channel 139 that is used to communicate updates to property changes of inventory objects on the host 112 that are managed by a virtualization management system 133.

The host management component 142 running on the host 112 includes a DTC aggregator 145 that listens to every data transport connection 124 occurring on a given host to determine an aggregate memory consumption 148. In particular, the DTC aggregator 145 determines a memory consumption associated with each data transport connection 124 and calculates the aggregate memory consumption 148 based on the sum of the values for the memory consumption of each data transport connection 124. The virtualization management system 133 uses the aggregate memory consumption 148 in decisions related to host selection for new data transport connections as well as determining an upgrade schedule for upgrading hosts 112. As shown in FIG. 2, the host management component 142 communicates the aggregate memory consumption 148 to the virtualization management system 133 via the second type of communication channel 151 that is used to communicate performance statistics associated with the host 112. Unlike the transmission of the DTC capacity parameter 127 via the first type of communication channel 139 which occurs only in response to a change in value of the DTC capacity parameter 127, the aggregate memory consumption 148 is transmitted to the virtualization management system 133 periodically (e.g., every minute, every five minutes, every hour, etc.) as this value is a dynamic value that depends on the active data transport connections 124 occurring on the given host.

Figure 3:
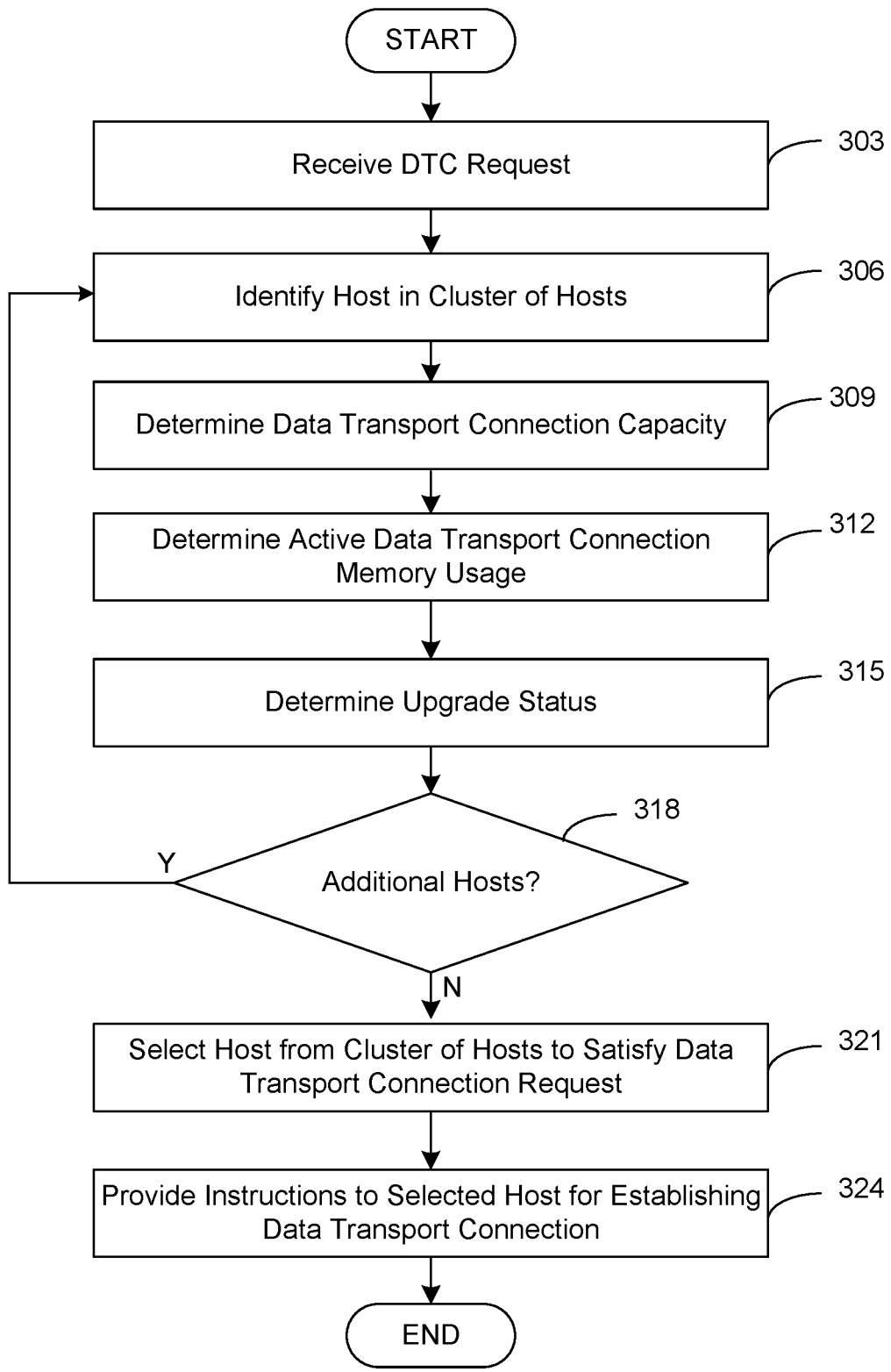
FIG. 3 is a flowchart illustrating how the virtualization management system obtains data transport connection data on the managed host devices and selects a host device to satisfy a data transport connection request according to various embodiments of the disclosure.

Referring to FIG. 3, shown is a flowchart showing an example operation of the virtualization management system 133 with regard to host selection for satisfying data transport connection requests according to various embodiments of the present disclosure. At step 303, the virtualization management system 133 receives a data transport connection request for establishing data transport connection withing a data center comprising one or more hosts 112. In various examples, a control plane task that requires a data transport connection can invoke a data transport connection request via an application programming interface (API) call.

At step 306, the virtualization management system 133 identifies a specific host in a cluster of hosts 112. As described, the cluster of hosts 112 can correspond to a data center for an enterprise. The virtualization management system 133 can identify a host in the cluster of hosts 112 based on a host identifier, a host location, or other type of data that distinguishes a host 112 from other hosts 112 in the data center.

At step 309, the virtualization management system 133 determines the data transport connection capacity for the host 112 according to the DTC capacity parameter 127 provided by the DTC service 130 on the host via the first type of communication channel 139. In various examples, the DTC service 130 reports the DTC capacity parameter 127 through the first type of communication channel 139 that is used to communicate updates to property changes of inventory objects on the host 112 that are managed by a virtualization management system 133. In various examples, the DTC capacity parameter 127 is communicated to the virtualization management system 133 upon initialization of the host 112. In other examples, the DTC capacity parameter 127 is communicated to the virtualization management system 133 in response to a user-defined changed in the property value of the DTC capacity parameter 127. In some examples, the DTC capacity parameter 127 is stored in the virtualization database 136.

At step 312, the virtualization management system 133 determines the active data transport connection memory usage for the host 112. The active data transport connection memory usage for the host 112 is defined by the aggregate memory consumption 148 calculated by the DTC aggregator 145 on the host 112 and provided to the virtualization management system 133 according to a periodic schedule. In various examples, the DTC aggregator 145 determines a memory consumption associated with each data transport connection 124 and calculates the aggregate memory consumption 148 based on the sum of the values for the memory consumption of each data transport connection 124. In various examples, the host management component 142 on the host 112 communicates the aggregate memory consumption 148 as a performance statistic to the virtualization management system 133 via the second type of communication channel 151 that is used to communicate dynamically changing performance statistics associated with the host 112.

In various examples, a host 112 may be associated with a DTC capacity reserve 160 that was previously calculated by the DTC scheduler 154 to correspond to a predicted memory usage of a data transport connection 124 assigned to the host 112. As the data transport connection 124 may not be established on the given host or represented by the aggregate memory consumption 148 received from the DTC aggregator 145, the virtualization management system 133 can add the DTC capacity reserve 160 with the aggregate memory consumption 148 in determining the active data transport connection memory usage for the host 112

At step 315, the virtualization management system 133 determines an upgrade status 157 for the given host 112. The upgrade status 157 indicates whether the host is in a maintenance mode (e.g., currently being upgraded), scheduled to be in a maintenance mode (e.g., upgrade pending), or already upgraded. In various examples, upon initiation of an upgrade, all hosts 112 can be flagged with a maintenance request or other type of upgrade indicator. When a given host 112 completes an upgrade, the maintenance request can be cleared indicating, that the host 112 has been upgraded. In addition, when the host 112 is in the process of being upgraded, the host 112 can be placed in a maintenance mode, thereby indicating that the host 112 is currently being upgraded. As such, the virtualization management system 133 determines the upgrade status 157 for the given host 112 according to whether the host 112 is in the maintenance mode or whether the host 112 has been flagged with a maintenance request or other type of upgrade indicator.

At step 318, the virtualization management system 133 determines if there are additional hosts 112 in the cluster of hosts 112 that require a determination of data transport connection information and upgrade status 157. If there are additional hosts 112, the virtualization management system 133 returns to step 306. Otherwise, the virtualization management system 133 proceeds to step 321.

At step 321, the virtualization management system 133 via the DTC scheduler 154 selects a host 112 from the cluster of hosts 112 to satisfy the data transport connection request. In various examples, the DTC scheduler 154 selects a host 112 for satisfying a data transport connection request according to the upgrade status 157 and the available data transport capacity. In various examples, the DTC scheduler 154 filters out candidate hosts 125 having an upgrade status 157 that indicates that there are in a maintenance mode (e.g., currently being upgraded) or are scheduled to be in a maintenance mode (e.g., upgrade pending). In some examples, fault domains associated with candidate hosts are considered where virtual machines 118 may be executed in a multi fault-domain setup. In these scenarios, the DTC scheduler 154 filters out candidate hosts 112 that are in different fault domains (e.g., hardware components of hosts 112 sharing a single point of failure) to reduce the data transfer overhead across different data centers. Based on the remaining candidate hosts 112, the DTC scheduler 154 analyzes the data transport connection information (aggregate memory consumption 148, DTC capacity parameter 127) and the DTC capacity reserve 160, if applicable, and/or other factors (e.g., minimum CPU requirements, minimum network bandwidth requirements, minimum storage requirements, prioritization policies, etc.) to identify the optimal host 112 for satisfying a data transport connection 124 associated with the data transport connection request. For example, the optimal host 112 (e.g., the selected host 112) may comprise the host 112 with the most data transport resources available in view of the data transport connection information and DTC capacity reserve 160.

At step 324, the virtualization management system 133 provides instructions to the selected host 112 for establishing the requested data transport connection 124. For example, the virtualization management system 133 can generate a data transport connection ticket defining the requested data transport connection 124 and send the data transport connection ticket to the host 112. Upon receipt of the data transport connection ticket, the selected host 112 can establish the data transport connection 124 and begin the requested file transfer. Thereafter, the process proceeds to completion.

Figure 4:
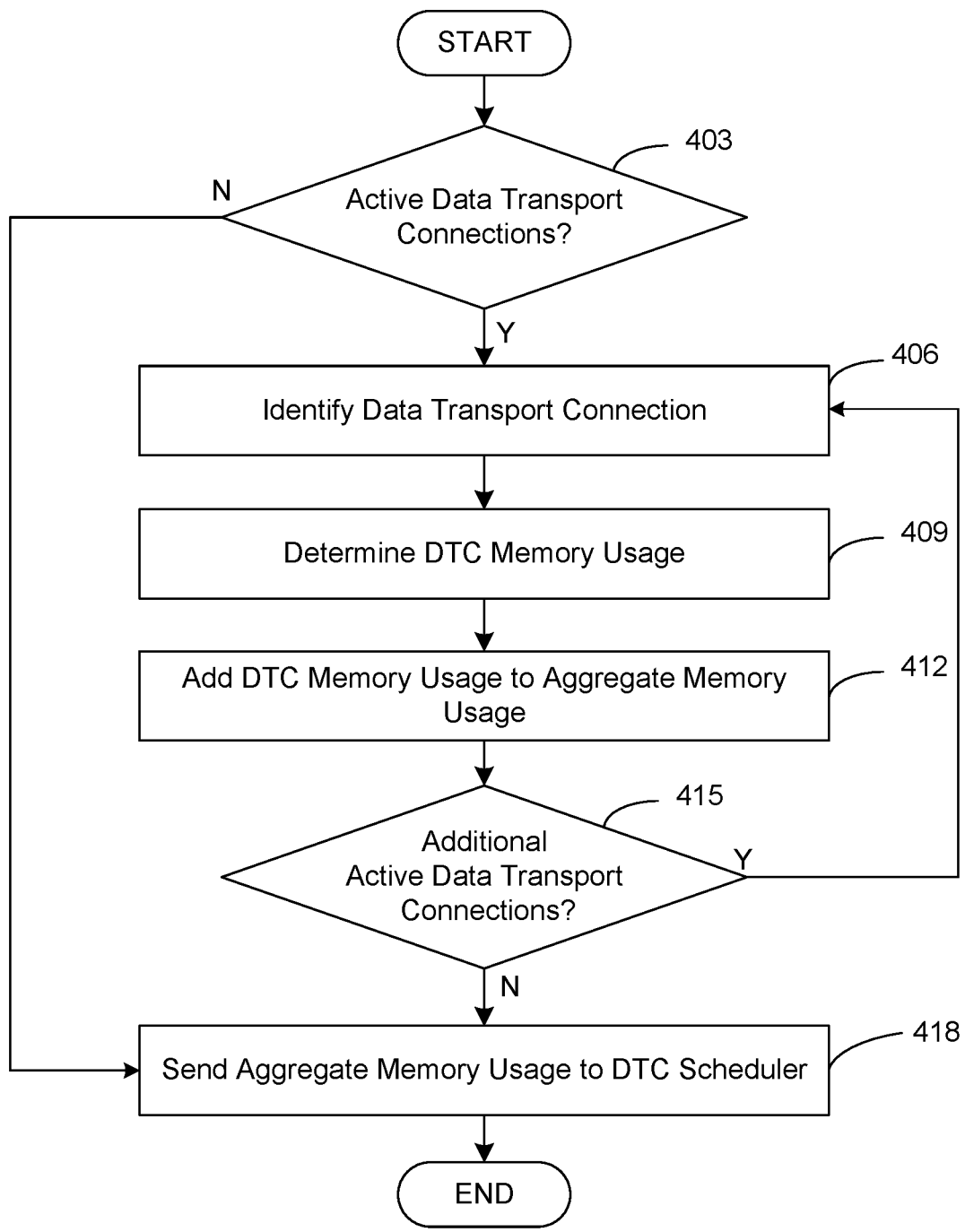
FIG. 4 is a flowchart illustrating how a data transport connection (DTC) aggregator determines a DTC memory usage for a given host and provides the arc memory usage to the virtualization management system according to various embodiments of the disclosure.

Referring to FIG. 4, shown is a flowchart showing an example operation of the DTC aggregator 145 of the host management component 142 with regard to the calculation of the aggregate memory consumption 148 for active data transport connections 124 occurring on the host 112 according to various embodiments. At step 403, the host management component 142 via the DTC aggregator 145 determines if there are any active data transport connections 124 occurring on the host 112. If the DTC aggregator 145 detects active data transport connections 124 occurring on the host 112, the DTC aggregator 145 proceeds to step 406. Otherwise, the DTC aggregator 145 proceeds to step 418. can notify the virtualization management system 133 that the aggregate memory consumption 148 is zero and this process proceeds to completion.

At step 406, the DTC aggregator 145 identifies a given data transport connection 124 that is actively occurring on the host 112. In various examples, the DTC aggregator 145 is configured to listen to every data transport connection 124 occurring on the host 112. As such, the DTC aggregator 145 identifies the given data transport connection 124 randomly, consecutively or based on one or more properties (e.g., identifier, port number, size of data being transferred, etc.) associated with the data transport connection 124.

At step 409, the DTC aggregator 145 determines the memory usage associated with the data transport connection 124. In various examples, the DTC aggregator 145 determines the memory usage associated with the data transport connection 124 may determine the memory buffer size that is allocated for the file transfer associated with the data transport connection 124. In other examples, the data transport connection 124 may indicate a memory usage associated with the given file transfer.

At step 412, the DTC aggregator 145 adds the determined memory usage to value of the aggregate memory consumption 148. This value is originally set to zero and increases to represent the memory usage for each data transport connection 124. For example, for the first data transport connection 124 being analyzed, the aggregate memory consumption 148 equals the determined memory usage of the first data transport connection 124. However, for subsequent data transport connections 124, the aggregate memory consumption 148 represents the sum of all values of the memory usage for all analyzed data transport connections 124.

At step 415, the DTC aggregator 145 determines if there are additional data transport connections 124. If there are additional data transport connections 124, the DTC aggregator 145 returns to step 406. Otherwise, the DTC aggregator 145 proceeds to step 418.

At step 418, the DTC aggregator 145 communicates the aggregate memory consumption 148 associated with active data transport connections 124 on the host 112 to the virtualization management system 133. As this value is a dynamically changing value based on the active data transport connections at a given time, the DTC aggregator communicates the aggregate memory consumption 148 as a performance statistic to the virtualization management system 133 via the second type of communication channel 151 (FIG. 2) that is used to communicate dynamically changing performance statistics associated with the host 112. Thereafter, the process proceeds to completion.

Figure 5:
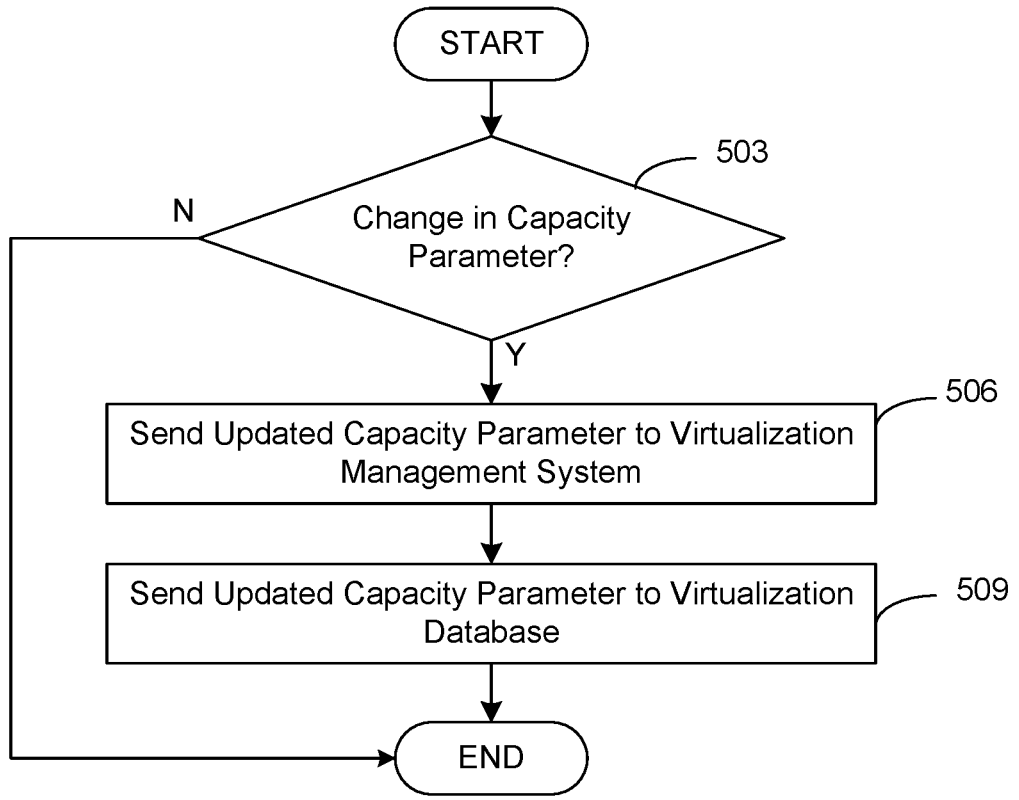
FIG. 5 is a flowchart illustrating how the data transport connection (DTC) service provides a DTC capacity parameter to the virtualization management system according to various embodiments of the disclosure.

Referring to FIG. 5, shown is a flowchart showing an example operation of the DTC service 130 with regard to the transmission of a changed DTC capacity parameter 127 to the virtualization management system 133 according to various embodiments. In particular, the memory used by a data transport connection 124 comes from a fixed size resource pool on the host 112 that is defined by the DTC capacity parameter 127 which is a configurable parameter associated with a DTC service 130. Upon initialization of the host 112, the virtualization management system 133 may be made aware of the DTC capacity parameter 127. In other examples, the virtualization management system 133 may be made aware of a default configuration value for the DTC capacity parameter 127. FIG. 5 corresponds to notification of the DTC capacity parameter 127 in response to a change of the value.

At step 503, the DTC service 130 determines if there is a change in the DTC capacity parameter 127. If there is no change to the value of the DTC capacity parameter 127, this process proceeds to completion. Otherwise, the DTC service 130 proceeds to step 506.

At step 506, the DTC service 130 sends the updated DTC capacity parameter to the virtualization management system 133. In various examples, the DTC service 130 reports the DTC capacity parameter 127 to the virtualization management system 133 via the first type of communication channel 139 that is used to communicate updates to property changes of inventory objects on the host 112 that are managed by a virtualization management system 133.

At step 509, the DTC service 130 sends the updated DTC capacity parameter 127 to the virtualization database 136 for storage in the virtualization database 136. Thereafter, this process proceeds to completion.

Functionality attributed to the virtualization management system 133, host management component 142, and DTC service 130 can be implemented in a single process or application or in multiple processes or applications. The separation or segmentation of functionality as discussed herein is presented for illustrative purposes only.

The flowcharts of FIGS. 3-5 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The virtualized computing environment 103 and the client devices 106 or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the virtualization management system 133, the DTC service 130, the host management component 142, the client application 172, and/or other components can be stored in one or more storage devices and be executable by one or more processors. Also, a data store can be stored in the one or more storage devices.

The virtualization management system 133, the DTC service 130, the host management component 142, the client application 172, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in at least one computing device or by using multiple computing devices.

As used herein, "about," "approximately," and the like, when used in connection with a numerical variable, can generally refers to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A system for managing inventory for data transport connections in a virtualized computing environment, comprising:
at least one computing device comprising a processor and a memory; and
program instructions executable in the at least one computing device that, when executed by the at least one computing device, cause the at least one computing device to:
for individual host devices of a cluster of host devices in the virtualized computing environment:
determine a data transport connection capacity;
determine an aggregate memory consumption for one or more active data transport connections; and
determine an upgrade status;
select a particular host device of the cluster of host devices to satisfy a data transport connection request based on the data transport connection capacity, the aggregate memory consumption, and the upgrade status;
generate a data transport connection ticket defining the data transport connection request;
provide instructions comprising at least the data transport connection ticket for establishing a data transport connection to the particular host device; and
initiate an information transfer upon an establishment of the data transport connection from at least in part the particular host device.

2. The system of claim 1, wherein determining the data transport connection capacity further comprises receiving the data transport connection capacity from a respective host device in response to a user-defined value change of the data transport connection capacity for the respective host device.

3. The system of claim 1, wherein the aggregate memory consumption corresponds to an aggregation of memory usage associated with the one or more active data transport connections established on a respective host device at a given instance.

4. The system of claim 1, wherein determining the aggregate memory consumption comprises receiving the aggregate memory consumption at a periodic interval from a respective host device.

5. The system of claim 1, wherein the data transport connection capacity is determined in response to receiving a first communication from a respective host device via a first communication channel and the aggregate memory consumption is determined in response to receiving a second communication from the respective host device via a second communication channel.

6. The system of claim 1, wherein, when executed, the program instructions cause the at least one computing device to determine a predicted reserve capacity value associated with the data transport connection for the particular host device, the predicted reserve capacity value being used to evaluate the particular host device in response to receiving a subsequent data transfer request.

7. The system of claim 1, wherein the upgrade status for the individual host devices comprises one of: a currently being upgraded status, a waiting to be upgraded status, or an upgrade complete status, and the upgrade status for the particular host device is the upgrade complete status.

8. A method, comprising:
for individual host devices of a cluster of host devices in a virtualized computing environment:
determining, by a computing device, a data transport connection capacity;

determining, by a computing device, an aggregate memory consumption for one or more active data transport connections; and
determining, by a computing device, an upgrade status;
selecting, by a computing device, a particular host device of the cluster of host devices to satisfy a data transport connection request based on the data transport connection capacity, the aggregate memory consumption, and the upgrade status;
generating a data transport connection ticket defining the data transport connection request;
providing, by a computing device, instructions comprising at least the data transport connection ticket for establishing a data transport connection to the particular host device; and
initiating a transfer of information upon establishment of the data transport connection from the particular host device.

9. The method of claim 8, wherein determining the data transport connection capacity further comprises receiving the data transport connection capacity from a respective host device in response to a user-defined value change of the data transport connection capacity for the respective host device.

10. The method of claim 8, wherein the aggregate memory consumption corresponds to an aggregation of memory usage associated with the one or more active data transport connections established on a respective host device at a given instance.

11. The method of claim 8, wherein determining the aggregate memory consumption comprises receiving the aggregate memory consumption at a periodic interval from a respective host device.

12. The method of claim 8, wherein the data transport connection capacity is determined in response to receiving a first communication from a respective host device via a first communication channel and the aggregate memory consumption is determined in response to receiving a second communication from the respective host device via a second communication channel.

13. The method of claim 8, further comprising determining a predicted reserve capacity value associated with the data transport connection for the particular host device, the predicted reserve capacity value being used to evaluate the particular host device in response to receiving a subsequent data transfer request.

14. The method of claim 8, wherein the upgrade status for the individual host devices comprises one of: a currently being upgraded status, a waiting to be upgraded status, or an upgrade complete status, and the upgrade status for the particular host device is the upgrade complete status.

15. A non-transitory computer readable storage medium embodying executable instructions which, when executed by a processor, cause a computing device to at least:

for individual host devices of a cluster of host devices in a virtualized computing environment:
determine a data transport connection capacity;
determine an aggregate memory consumption for one or more active data transport connections; and
determine an upgrade status;
select a particular host device of the cluster of host devices to satisfy a data transport connection request based on the data transport connection capacity, the aggregate memory consumption, and the upgrade status;
generate a data transport connection ticket defining the data transport connection request;
provide instructions comprising at least the data transport connection ticket for establishing a data transport connection to the particular host device; and
initiate an information transfer upon an establishment of the data transport connection from at least in part the particular host device.

16. The non-transitory computer readable storage medium of claim 15, wherein determining the data transport connection capacity further comprises receiving the data transport connection capacity from a respective host device in response to a user-defined value change of the data transport connection capacity for the respective host device.

17. The non-transitory computer readable storage medium of claim 15, wherein the aggregate memory consumption corresponds to an aggregation of memory usage associated with the one or more active data transport connections established on a respective host device at a given instance.

18. The non-transitory computer readable storage medium of claim 15, wherein determining the aggregate memory consumption comprises receiving the aggregate memory consumption at a periodic interval from a respective host device.

19. The non-transitory computer readable storage medium of claim 15, wherein the data transport connection capacity is determined in response to receiving a first communication from a respective host device via a first communication channel and the aggregate memory consumption is determined in response to receiving a second communication from the respective host device via a second communication channel.

20. The non-transitory computer readable storage medium of claim 15, wherein, when executed, the executable instructions cause the processor to determine a predicted reserve capacity value associated with the data transport connection for the particular host device, the predicted reserve capacity value being used to evaluate the particular host device in response to receiving a subsequent data transfer request.

* * * * *